(12) United States Patent
Schwobe et al.

(10) Patent No.: US 10,935,151 B2
(45) Date of Patent: Mar. 2, 2021

(54) SOLENOID ACTUATOR WITH FIRING PIN POSITION DETECTION

(71) Applicants: Patrick Thomas Schwobe, Jackson, WI (US); Brett G. Berger, Hartford, WI (US)

(72) Inventors: Patrick Thomas Schwobe, Jackson, WI (US); Brett G. Berger, Hartford, WI (US)

(73) Assignee: TLX Technologies, LLC., Pewaukee, WI (US)

( * ) Notice: Subject to any disclaimer, the term of this patent is extended or adjusted under 35 U.S.C. 154(b) by 202 days.

(21) Appl. No.: 16/058,014

(22) Filed: Aug. 8, 2018

(65) Prior Publication Data
US 2019/0063632 A1    Feb. 28, 2019

Related U.S. Application Data

(60) Provisional application No. 62/551,556, filed on Aug. 29, 2017.

(51) Int. Cl.
| | | |
|---|---|---|
| *H01F 3/00* | (2006.01) | |
| *F16K 31/02* | (2006.01) | |
| *A62C 37/36* | (2006.01) | |
| *A62C 37/50* | (2006.01) | |
| *A62C 35/13* | (2006.01) | |

(52) U.S. Cl.
CPC .............. *F16K 31/02* (2013.01); *A62C 37/04* (2013.01); *A62C 37/50* (2013.01); *A62C 35/13* (2013.01)

(58) Field of Classification Search
CPC .......... F16K 37/00; F16K 37/36; F16K 27/02; F16K 31/02; A62C 37/04; H01F 2007/1684; H01F 2007/185; H01F 2007/1844

USPC .......................................................... 335/264
See application file for complete search history.

(56) References Cited

U.S. PATENT DOCUMENTS

| | | | | |
|---|---|---|---|---|
| 2,723,681 A | * | 11/1955 | MacGlashan, Jr. | F16K 24/04 137/625.65 |
| 3,914,952 A | * | 10/1975 | Barbier | F25B 47/022 62/197 |
| 4,078,709 A | * | 3/1978 | Jenkins | G11B 15/103 226/180 |
| 4,305,002 A | * | 12/1981 | Mortensen | F02N 15/04 123/179.1 |

(Continued)

FOREIGN PATENT DOCUMENTS

KR    20-2009-0007709 U    7/2009

*Primary Examiner* — Shawki S Ismail
*Assistant Examiner* — Lisa N Homza
(74) *Attorney, Agent, or Firm* — Reinhart Boerner Van Deuren P.C.

(57) ABSTRACT

A solenoid actuator with firing pin position detection is provided. The solenoid actuator includes a solenoid assembly having movable armature. The solenoid assembly is mounted to a firing pin housing which houses a firing pin. The firing pin is arranged such that the movable armature acts upon the firing pin to transition it from an unfired position to a fired position. The solenoid actuator also includes a firing pin position switch is mounted within a bore that is transverse to a bore of the firing pin housing containing the firing pin. The firing pin includes cam surface that acts upon the firing pin position switch to ultimately provide an indication of whether the firing pin is in the fired or the unfired position.

25 Claims, 7 Drawing Sheets

(56) References Cited

U.S. PATENT DOCUMENTS

| | | | | |
|---|---|---|---|---|
| 4,383,234 | A * | 5/1983 | Yatsushiro | F16K 31/082 335/230 |
| 4,418,289 | A * | 11/1983 | Mortensen | F02N 15/04 290/38 R |
| 4,790,345 | A * | 12/1988 | Kolchinsky | F16K 31/0668 137/269 |
| 5,014,030 | A * | 5/1991 | Aston | E05B 47/0661 192/93 A |
| 5,154,203 | A * | 10/1992 | Krause | B60T 8/367 137/116.3 |
| 5,234,265 | A * | 8/1993 | Tyler | B60T 8/00 303/118.1 |
| 5,275,065 | A * | 1/1994 | Ruiter | F16H 59/10 192/220.2 |
| 5,299,600 | A * | 4/1994 | Aronovich | F15B 13/0402 137/625.65 |
| 5,508,487 | A * | 4/1996 | Smith | H01H 3/3031 200/400 |
| 5,607,137 | A * | 3/1997 | Kanda | F16K 31/0693 251/129.07 |
| 5,639,066 | A * | 6/1997 | Lambert | F02M 63/0017 251/129.07 |
| 5,734,310 | A * | 3/1998 | Ankney | H01F 7/121 335/228 |
| 5,918,630 | A * | 7/1999 | Lucas | F02M 59/466 137/596.17 |
| 5,918,635 | A * | 7/1999 | Wang | F16K 31/0693 137/625.65 |
| 6,155,503 | A * | 12/2000 | Benson | F02M 51/06 239/585.1 |
| 6,229,421 | B1 * | 5/2001 | Floyd | H01F 7/124 335/229 |
| 6,247,456 | B1 * | 6/2001 | Everingham | F02M 25/0836 123/458 |
| 6,631,633 | B1 * | 10/2003 | Garg | G05D 16/2024 73/1.57 |
| 6,688,853 | B1 * | 2/2004 | Burkett | F04B 27/1804 251/61 |
| 6,791,442 | B1 * | 9/2004 | Schmidt | H01F 7/1615 335/220 |
| 6,856,221 | B1 * | 2/2005 | Zehrung | E05B 47/0002 335/220 |
| 7,602,270 | B2 * | 10/2009 | Krause | H01F 7/124 335/220 |
| 10,495,117 | B1 * | 12/2019 | Pena | F15B 13/029 |
| 2001/0030589 | A1 * | 10/2001 | Dahlgren | H01F 7/1615 335/220 |
| 2002/0149456 | A1 * | 10/2002 | Krimmer | H01F 7/124 335/220 |
| 2005/0093662 | A1 * | 5/2005 | Hoffman | F02N 15/067 335/220 |
| 2008/0023661 | A1 * | 1/2008 | Gu | F16K 31/406 251/30.01 |
| 2008/0087345 | A1 * | 4/2008 | Tabor | F16K 11/0716 137/625.65 |
| 2009/0057583 | A1 * | 3/2009 | Van Weelden | F16K 31/0613 251/12 |
| 2009/0212244 | A1 * | 8/2009 | Pfaff | F15B 13/0433 251/30.03 |
| 2010/0005646 | A1 * | 1/2010 | Manubolu | H01F 7/1623 29/596 |
| 2010/0007224 | A1 * | 1/2010 | Manubolu | F02M 47/027 310/14 |
| 2011/0168813 | A1 * | 7/2011 | Bunni | F02M 47/027 239/585.4 |
| 2012/0268225 | A1 * | 10/2012 | Mahajan | H01F 7/13 335/261 |
| 2012/0285417 | A1 * | 11/2012 | Kim | F02D 19/0684 123/299 |
| 2012/0318534 | A1 * | 12/2012 | Dahlgren | F16K 31/003 169/11 |
| 2013/0047964 | A1 * | 2/2013 | Kim | F02M 63/008 123/478 |
| 2013/0126328 | A1 * | 5/2013 | Mainland | F16K 31/10 200/81 R |
| 2013/0135065 | A1 * | 5/2013 | Neet | F02N 15/067 335/72 |
| 2013/0169388 | A1 * | 7/2013 | LaFountain | H01H 36/0073 335/205 |
| 2014/0014864 | A1 * | 1/2014 | Najmolhoda | F16K 11/0716 251/129.15 |
| 2014/0270928 | A1 * | 9/2014 | Howard | A62C 37/04 403/327 |
| 2016/0356395 | A1 * | 12/2016 | Rogala | F16K 37/0041 |
| 2017/0021213 | A1 | 1/2017 | Ryczek et al. | |
| 2017/0326395 | A1 * | 11/2017 | Schwobe | F16K 31/0655 |
| 2017/0328492 | A1 * | 11/2017 | Schwobe | A62C 35/68 |
| 2019/0063632 | A1 * | 2/2019 | Schwobe | F16K 31/02 |
| 2019/0103797 | A1 * | 4/2019 | Li | H01F 7/081 |
| 2019/0131048 | A1 * | 5/2019 | Bavisetti | H01F 7/1607 |
| 2019/0368632 | A1 * | 12/2019 | Stumpe | H01F 7/06 |
| 2020/0003324 | A1 * | 1/2020 | Zahe | F16K 31/05 |
| 2020/0051723 | A1 * | 2/2020 | Mahajan | H01F 7/1607 |
| 2020/0141426 | A1 * | 5/2020 | Diaz | F16K 31/0679 |
| 2020/0182372 | A1 * | 6/2020 | Biehl | F16K 31/05 |

* cited by examiner

SOLENOID ACTUATOR WITH FIRING PIN POSITION DETECTION

CROSS-REFERENCE TO RELATED PATENT APPLICATIONS

This patent application claims the benefit of U.S. Provisional Patent Application No. 62/551,556, filed Aug. 29, 2017, the entire teachings and disclosure of which are incorporated herein by reference thereto.

FIELD OF THE INVENTION

This invention generally relates to actuators, more particularly to solenoid actuators, and more particularly to solenoid actuators utilized for fire suppression system actuation.

BACKGROUND OF THE INVENTION

Fire suppression systems use pressurized containers of a fire suppressant material under high pressure. These pressurized containers are installed in a system that includes plumbing from each container to a location associated with the fire detection or fire alarm switch used to initiate delivery of the fire suppressant material from the container through the plumbing to suppress the fire. A solenoid actuator is associated with each container and is operable to operate a discharge valve coupled to the container to release the suppressant material from the pressurized container to the plumbing that delivers the suppressant material to the area of the fire.

Because it is important that such solenoid actuators activate when called upon, there are various industry requirements regarding periodically testing and actively monitoring such actuators. With regard to periodic testing, the solenoid actuator must be periodically removed and tested to make sure it will function properly when called upon. During testing, the solenoid coil of the valve is tested to ensure it will function when needed. Since such systems typically contain many such solenoid valves, they must be tested, and assuming that it passes the test, reinstalled into the system.

With regard to active monitoring, the National Fire Protection Association has passed requirements that fire suppression systems having an electric actuator must be "supervised" and provide audible and visual indication of system impairment at the system's releasing control panel. This supervision can include detecting good electrical connection to the solenoid, among other things. Further, such active monitoring can also include detecting if the magnetic coils are installed properly, either initially or after being removed for the coil testing mentioned above.

Still further, such active monitoring can also include monitoring the position of the firing pin of the solenoid to detect if it is in correct position prior to installation. Indeed, if the firing pin is in its fully actuated position, when the solenoid actuator is installed on the valve, it will inadvertently open the valve causing an unintended discharge of the fire suppression material within the tank connected to said valve. Such monitoring of the pin position also allows one to quickly determine which ones of a group of solenoid actuators which are installed on valves have indeed been actuated.

Unfortunately, the known methods of pin position detection involve utilizing a switch which is arranged parallel to the direction of movement of the pin. When the firing pin is actuated or "fired," a portion of the pin axially contacts and depresses the switch to provide an indication that the firing pin has fired. This axial contact, however, is problematic as it results in repeated impact loading on the switch. Indeed, the firing pin movement is considerably rapid, and as such, a significant amount of force is imparted immediately to the switch. This can cause premature switch failure, or alternatively, require the use of more robust switches which drive up cost.

Accordingly, there is a need in the art for a solenoid actuator for a fire suppression system which provides for pin position detection without the drawbacks of existing designs as noted above. The invention provides such a solenoid actuator. These and other advantages of the invention, as well as additional inventive features, will be apparent from the description of the invention provided herein.

BRIEF SUMMARY OF THE INVENTION

In one aspect, the invention provides a solenoid actuator which provides for firing pin position detection. An embodiment according to this aspect includes a solenoid actuator that has a movable armature which is movable along a longitudinal axis of the solenoid actuator. The solenoid actuator also includes a firing pin housing that has a first bore aligned along the longitudinal axis and a second bore communicating with the first bore. The second bore defines a bore axis transverse to the longitudinal axis. The solenoid actuator also includes a firing pin movable within the first bore of the firing pin housing. The firing pin is arranged such that it the movable armature contacts the firing pin to transition the firing pin from an unfired position to a fired position. A firing pin position switch is positioned within the second bore of the firing pin housing and arranged to detect when the firing pin is in the unfired and fired position.

In certain embodiments, the coil assembly further comprises a solenoid coil for moving the movable armature. The solenoid coil and armature are contained by a solenoid housing of the solenoid assembly. The solenoid assembly is attached to the firing pin housing.

In certain embodiments, the firing pin housing includes a termination port for connecting lead wires to the solenoid actuator. An electrical connection is formed between the solenoid coil and the lead wires within the firing pin housing.

In certain embodiments, the firing pin includes a cam surface along a length of the firing pin. The cam surface is arranged such that it contacts the firing pin position switch upon a movement of the firing pin within the first bore. The firing pin position switch may be a push-button switch which includes a protruding armature. Depression of said protruding armature either opens or closes the firing pin position switch. In this way, the protruding armature is a cam follower which follows the cam surface of the firing pin.

In certain embodiments, the firing pin position switch is one of a push button style switch, a Hall Effect sensor, or a light sensor.

In certain embodiments, the solenoid actuator also includes a shroud connected to the firing pin housing for providing a connection feature.

In certain embodiments, the solenoid actuator also includes a connection detection switch that is operable to detect when said solenoid actuator is installed on a device.

In another aspect, the invention provides a solenoid actuator with firing pin position detection. An embodiment according to this aspect includes a solenoid assembly having a movable armature. The solenoid actuator also includes a firing pin housing having a first bore and a second bore. A firing pin is movable within the first bore of the firing pin housing and arranged such that the movable armature contacts the firing pin to transition the firing pin from an unfired position to a fired position. The firing pin has a cam surface along a length thereof. The solenoid actuator also includes a firing pin position switch. The firing pin position switch is mounted within the second bore and arranged such the firing pin position switch is actuated by the cam surface of the firing pin.

In certain embodiments, the coil assembly further comprises a solenoid coil for moving the movable armature. The solenoid coil and armature are contained by a solenoid housing of the solenoid assembly.

In certain embodiments, the firing pin housing includes a termination port for connecting lead wires to the solenoid actuator. An electrical connection is formed between the solenoid coil and the lead wires within the firing pin housing.

In certain embodiments, the cam surface of the firing pin has a cross sectional area perpendicular to the length of the firing pin which continuously varies along the length of said firing pin.

The firing pin position switch may be a push-button switch which includes a protruding armature. Depression of said protruding armature either opens or closes the firing pin position switch. In this way, the protruding armature is a cam follower which follows the cam surface of the firing pin.

In certain embodiments, wherein the firing pin position switch includes a visual indicator in the form of an LED light which provides an indication of a switch state of the firing pin position switch.

In certain embodiments, the solenoid actuator also includes a shroud connected to the firing pin housing for providing a connection feature.

In certain embodiments, the solenoid actuator also includes a connection detection switch that is operable to detect when said solenoid actuator is installed on a device.

In certain embodiments, the first bore is arranged along a longitudinal axis of the solenoid actuator, and the second bore defines a bore axis. The bore axis is transverse to the longitudinal axis.

In yet another aspect, the invention provides a method of forming a solenoid actuator. An embodiment of such a method includes providing a solenoid assembly comprising a movable armature that is movable along a longitudinal axis of the solenoid actuator. The method also includes connecting the solenoid assembly to a firing pin housing. The firing pin housing has a first bore aligned along the longitudinal axis and a second bore communicating with the first bore. The second bore defines a bore axis transverse to the longitudinal axis. The method also includes situating a firing pin within the first bore of the firing pin housing such that the movable armature contacts the firing pin to transition the firing pin from an unfired position to a fired position. The method also includes situating a firing pin position switch within the second bore of the firing pin housing such that the firing pin position switch detects when the firing pin is in the unfired and fired position.

In certain embodiments, the step of situating the firing pin within the housing includes situating a firing pin with a cam surface within the housing such that the cam surface contacts an armature of the firing pin position switch upon a movement of the firing pin.

In certain embodiments, the step of situating the firing pin switch within the second bore includes situating the firing pin within the second bore such that a visual indicator of the firing pin switch is exposed on an exterior of the firing pin housing.

In certain embodiments, the step of situating the firing pin position switch within the second bore includes situating the firing pin position switch with the second bore at a predefined depth based on a stroke length of an armature of said firing pin position switch.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, FIGS. 1-7 illustrate various aspects of a solenoid actuator with firing pin detection (hereinafter referred to as "actuator 20") according to the teachings herein. Actuator 20 advantageously allows for firing pin position detection with advantages over the prior designs discussed above.

Figure 1:
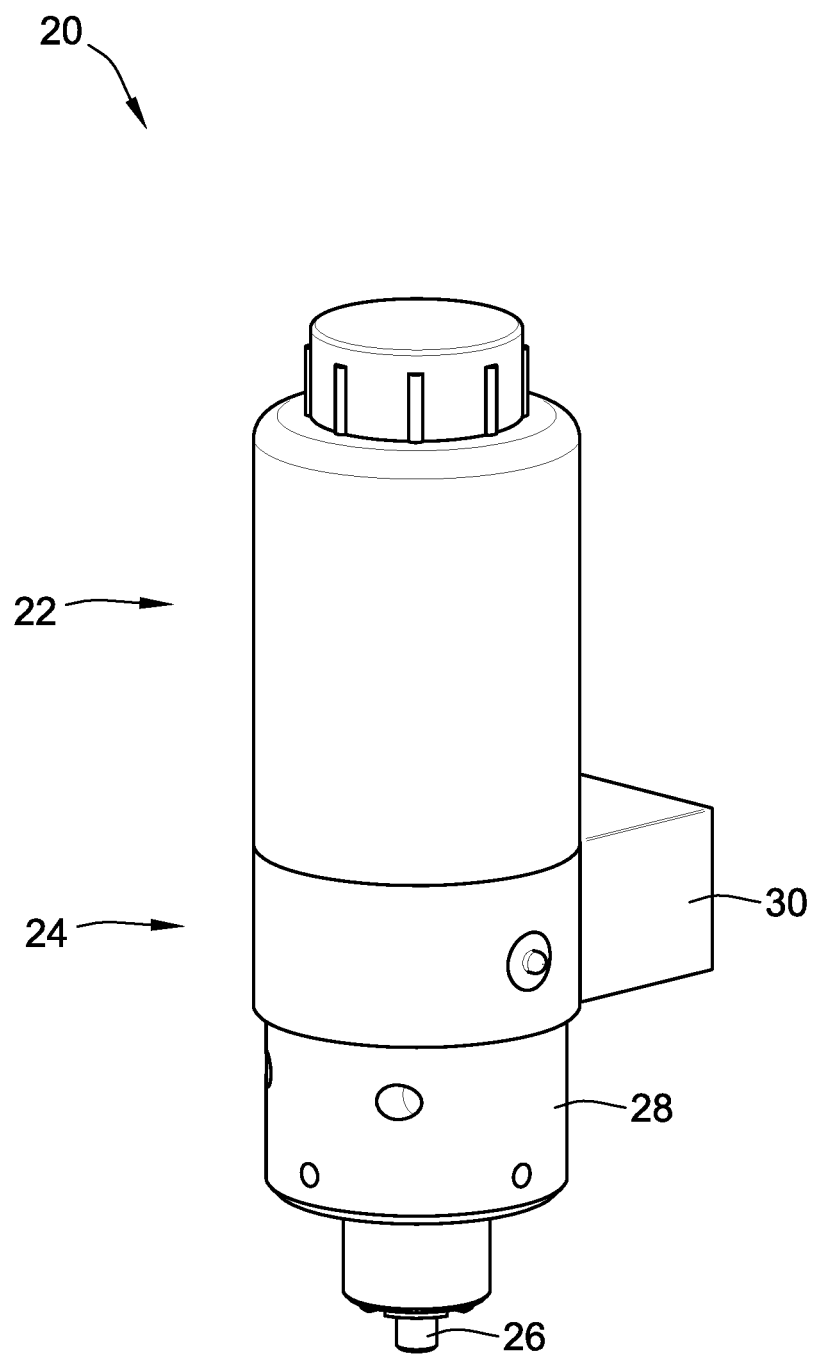
FIG. 1 is a perspective view of an exemplary embodiment of a solenoid actuator according to the teachings herein.

With particular reference to FIG. 1, actuator 20 is illustrated in a perspective view. Actuator 20 includes a solenoid assembly 22 that is mounted to a firing pin housing 24. Solenoid assembly 22 is responsible for linearly actuating a firing pin 26 of actuator 20. More particularly, solenoid assembly 22 is responsible for transitioning firing pin 26 from an unfired position to a fired position.

In the fired position, firing pin 26 extends sufficiently out of the remainder of actuator 20 to contact a pin or the like of a valve. As a particular example, actuator 20 may be associated with a fire suppression system. When solenoid assembly 22 actuates firing pin 26, firing pin 26 in turn actuates a control valve of the fire suppression system to release a fire suppressant into a desired area.

Actuator 20 also includes a shroud 28 which is mounted to firing pin housing 24. Shroud 28 is responsible for providing a mounting feature 68 (see FIG. 3) for connecting actuator 22 to a valve or the like. In the illustrated embodiment, mounting feature 68 is schematically illustrated as male threads. However, it is equally plausible to use female threading or any other type of mechanical connection configuration for mounting feature 68. The particular shape of mounting feature 68 is based on what actuator 20 will mount to.

Firing pin housing 24 also includes a termination port 30 for connecting electrical wiring 31 to actuator 20 (see FIG. 7), This wiring 31 is potted or otherwise sealed at termination port 30, and actual connection to such wiring to the various componentry of actuator 20 is achieved within the interior of actuator 20. This wiring 31 may be used to provide electrical power to a solenoid coil of solenoid assembly 22, as well as provide electrical power to any other sensors or devices contained within actuator 20, and or send or receive other electrical signals for open or closed loop control of actuator 20.

Figure 2:
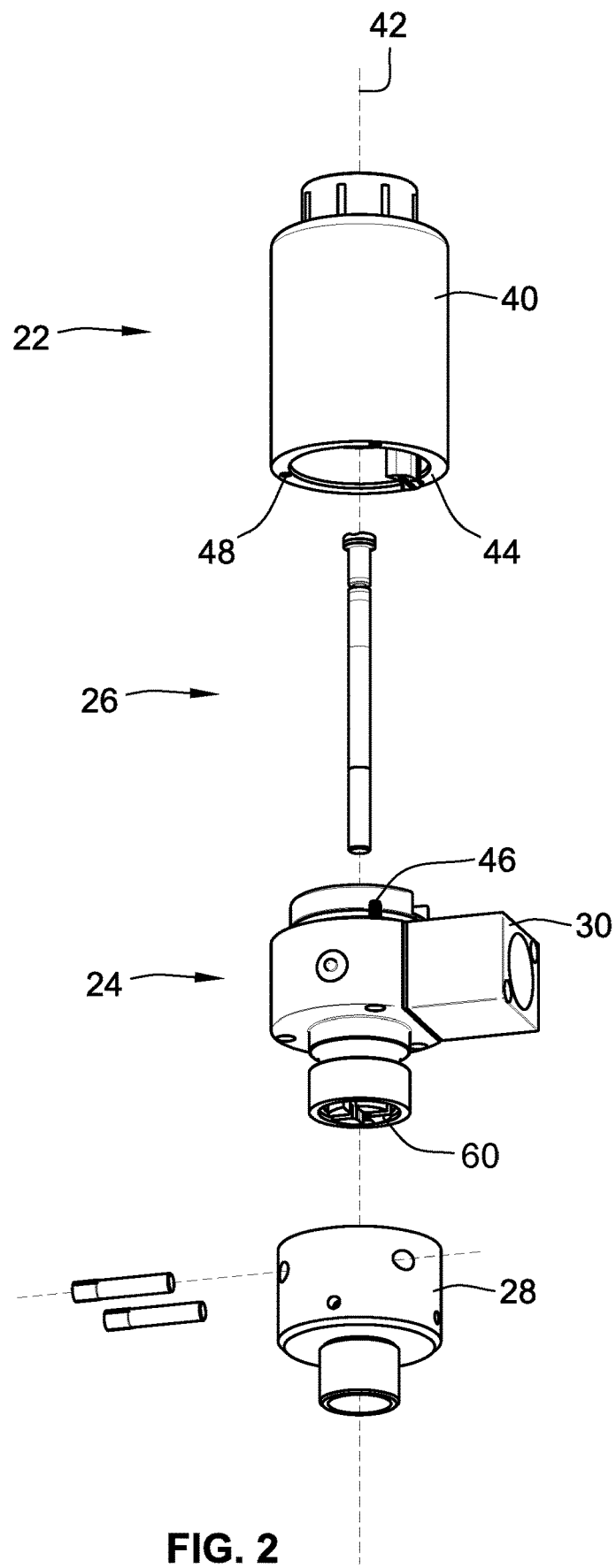
FIG. 2 is a perspective exploded view of the solenoid actuator of FIG. 1.

With reference now to FIG. 2, actuator 20 is illustrated in an exploded view. Solenoid assembly 22 mounts to firing pin housing 24 by way of fasteners 46 which are received in corresponding apertures 48 of a housing 40 of solenoid assembly 22. Firing pin 26 is primarily contained within firing pin housing 24. As discussed below, the extension of the end of firing pin 26 out of the remainder of actuator 20 is increased when firing pin 26 is acted upon by solenoid assembly 22.

As shown in FIG. 2, solenoid assembly 22, firing pin housing 24, firing pin 26, and shroud 28 are centered and aligned along a common longitudinal axis 42 of actuator 20. As can also be seen in this view, shroud 28 mounts to firing pin housing 24 via a pin and groove interface 56 (see FIG. 3) to allow shroud 28 to freely rotate about a center longitudinal axis 42 (see FIG. 2) of actuator 20. This allows the user to rotate the remainder of actuator 20, e.g. firing pin housing 24 and solenoid assembly 22 about longitudinal axis 42, despite shroud 28 being fixedly mounted to the aforementioned valve or like device.

Figure 3:
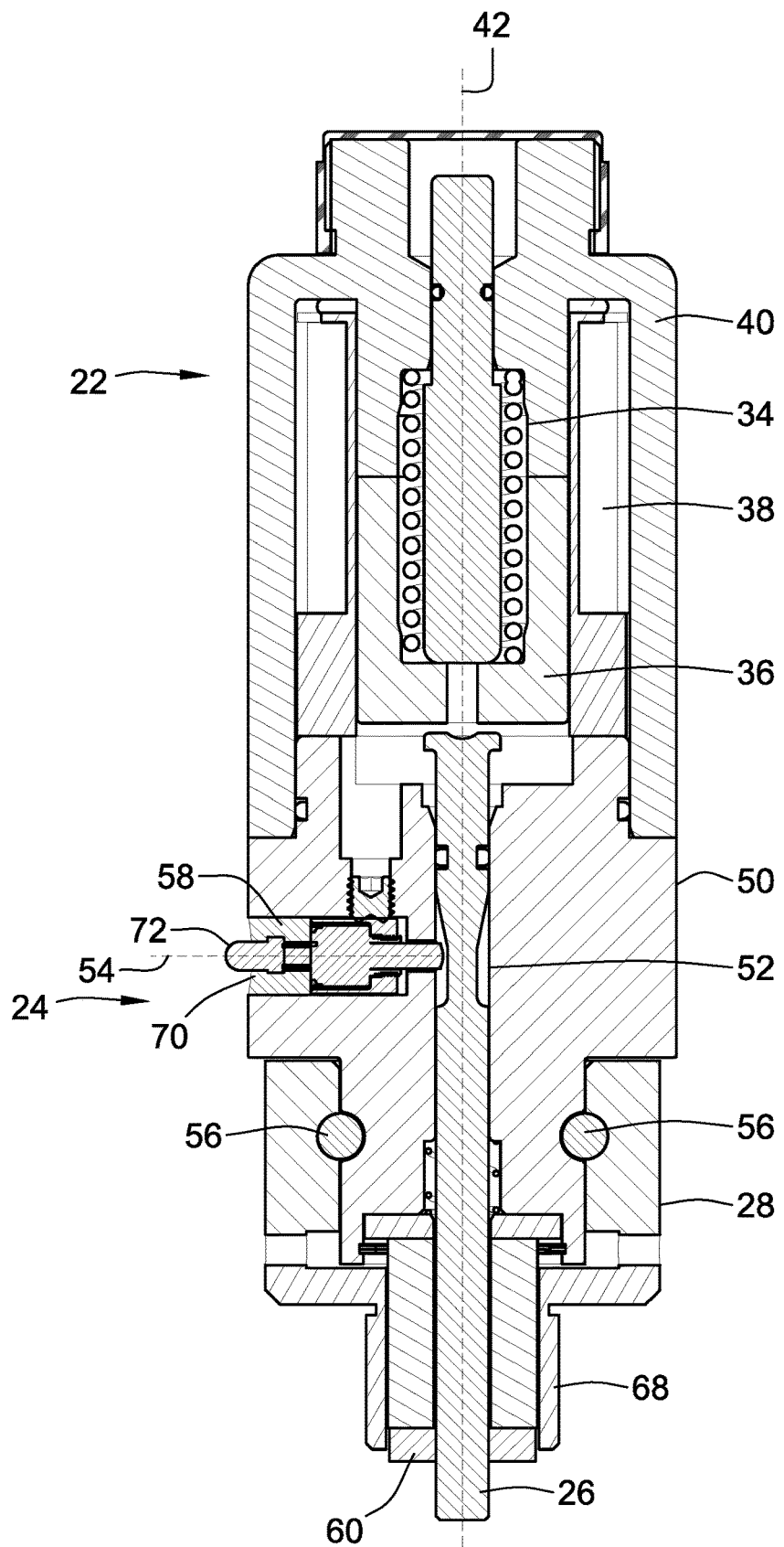
FIG. 3 is a cross section of the solenoid actuator of FIG. 1, with a firing pin and armature thereof shown in an unfired position.

Turning now to FIG. 3, solenoid assembly 22 includes a biasing element 34 for exerting a biasing force against a movable armature 36, as well as a solenoid coil 38 for exerting an electromagnetic force upon movable amateur 36 of solenoid assembly 22. Applying electrical current to solenoid coil 38 results in overcoming a magnetic force holding movable armature 36 in its seated position shown in FIG. 3 so that biasing element 34 can bias armature 36 towards firing pin 26 along axis 42 to actuate the same. This downward movement of movable armature 36 ultimately results in a contact of movable armature 36 with firing pin 26.

Figure 5:
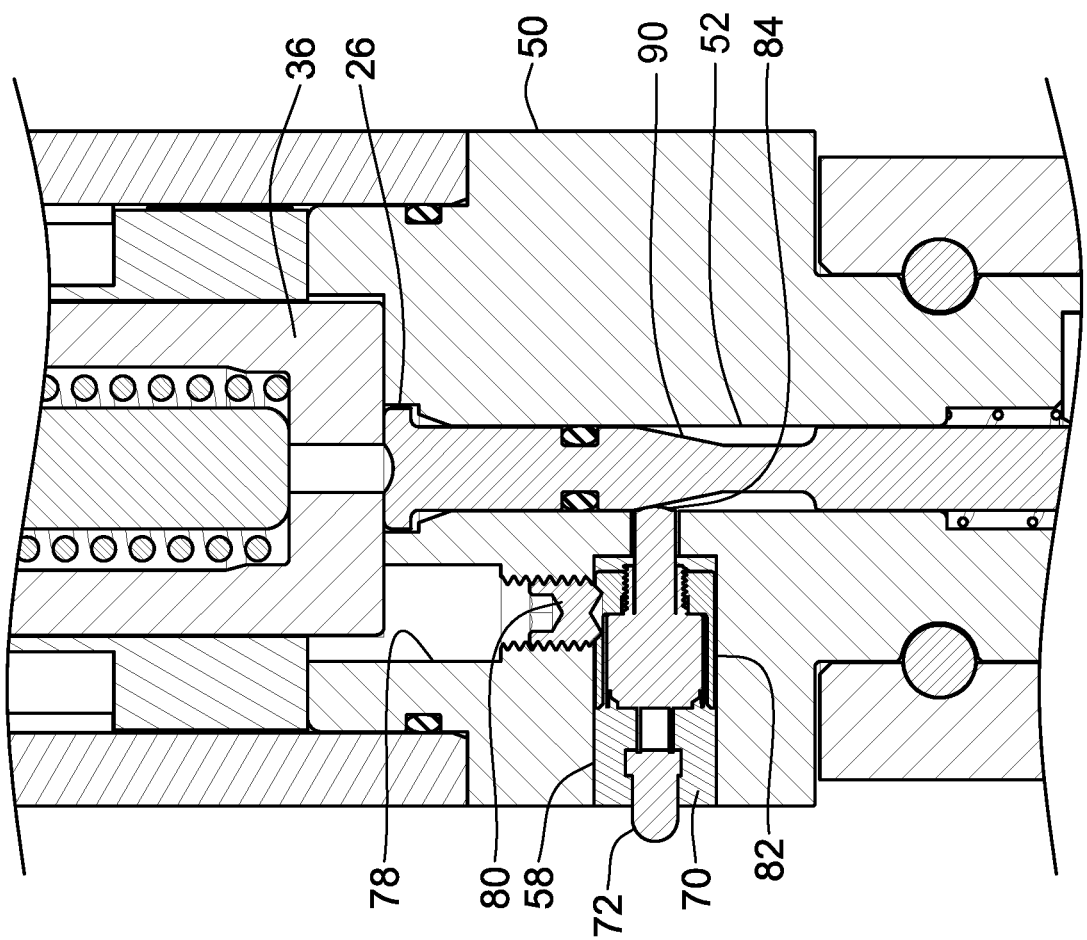
FIG. 5 is another partial view of the cross section of FIG. 3, with the armature and firing pin shown in a fired position.

In this way, firing pin 26 is transitioned from its unfired position as illustrated in FIG. 3 to its fired position as illustrated in FIG. 5. From the above description and figures, it will be recognized that solenoid assembly 22 is thus a latching solenoid. However, it is entirely possible via the teachings herein to use other types of solenoid actuators.

Returning momentarily to FIG. 2, solenoid assembly 22, and more particularly solenoid coil 38, includes an electrical terminal 44 for forming an electrical connection with contacts at termination port 30, and ultimately to lead wires connected to termination port 30. In this manner, solenoid coil 38 receives electric power to operate armature 36.

Returning now to FIG. 3, firing pin 26 is movable along axis 42 within a first bore 52 defined by and extending through firing pin housing 24. This first bore 52 is centered and aligned with longitudinal axis 42 and extends through a housing body 50 of firing pin housing 24. A second bore 58 is also formed in housing body 50. This second bore 58 defines a bore axis 54 as shown. Bore axis 54 is transverse to the longitudinal axis 42. In the illustrated embodiment, bore axis 54 is oriented at a right angle relative to longitudinal axis 42, as a non-limiting example. Other angles could be utilized as will be understood from the following.

A firing pin position switch 70 is situated within second bore 58. As will be described in the following, firing pin position switch 70 is operable to detect a position of firing pin 26. More particularly, firing pin position switch 70 is operable to detect when firing pin 26 is in the unfired position as shown in FIG. 3, as well as when firing pin 26 is in the fired position as shown in FIG. 5.

As a result of the geometrical relationship of the first and second bores 52, 58, firing pin position switch 70 is advantageously at a right angle relative to firing pin 26. As a result, firing pin 26 does not axially contact and impart any impact loading on switch 70 when transitioned from the unfired to the fired position. This has the advantage of allowing for a less robust switch to be utilized than in prior designs, and allows for a longer switch life.

Figure 4:
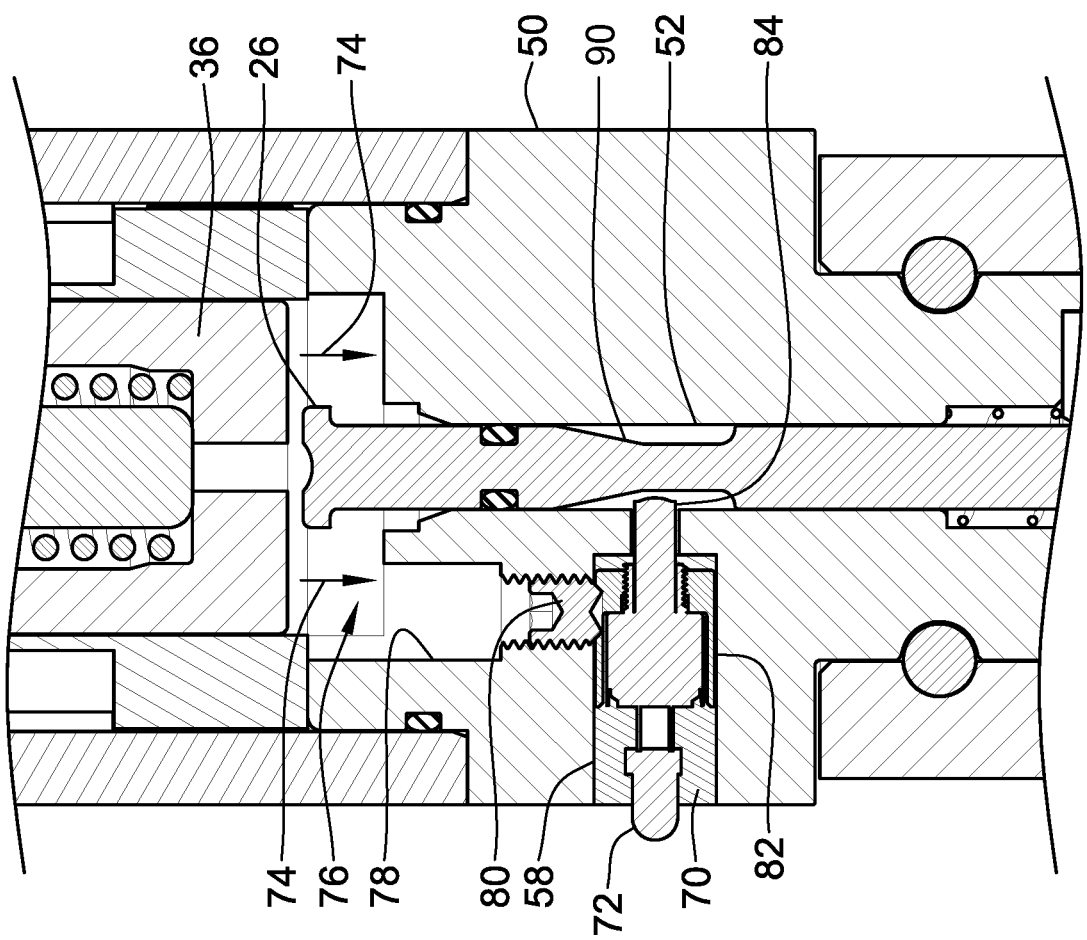
FIG. 4 is a partial view of the cross section of FIG. 3.

Turning now to FIG. 4, firing pin position switch 70 is embodied as a push-button style switch having a depressible armature 84. This depressible armature 84 acts as a cam follower and follows a cam surface on firing pin 26, as will be described below. In the unfired position as shown in FIG. 4, armature 84 remains out of contact with firing pin 26 and is thus not depressed or actuated by firing pin 26. Firing pin position switch 70 may be either a normally open switch, or a normally closed switch. In the illustrated embodiment and for non-limiting purposes of description, firing pin position switch 70 is a normally open switch.

Although not shown, firing pin position switch 70 is connected via internal electrical wiring to the aforementioned electrical wiring (not shown) at termination port 30. In this way, firing pin position switch may receive power from the same power source supplying power to solenoid coil 38, or alternatively a different source. Firing pin position switch 70 may also be connected via such electrical wiring to an external controller.

As will be seen from inspection of this figure, firing pin position switch 70 is surrounded by a support shield 82. A set screw is inserted through a third bore 78 of firing pin housing 24 and tightened against support shield 82 to hold firing pin position switch firmly within second bore 58. Firing pin position switch 70 also includes a visual indicator 72 which will illuminate based on a switch state. To this end, firing pin position switch 70 also includes a visual indicator 72 in the form of a light which will illuminate based on a switch state (i.e. open or closed) of firing pin position switch 70.

In FIG. 4, armature 84 remains out of contact with firing pin 26 when in the unfired position. More particularly, a cam surface 90 on firing pin 26 remains out of contact with armature 84 of firing pin position switch. However, upon energization of solenoid coil 38, armature 36 will move downwardly in direction 74 and contact firing pin 26, thereby causing a corresponding downward movement of firing pin 26.

With reference now to FIG. 5, armature 36 and firing pin 26 have completed their downward movement, and firing pin is thus now in the fired position. Armature 36 is received within an armature seating space 76 of firing pin housing 24, and as a result, firing pin 26 is pushed down thereby. As this transition occurs, armature 84 is contacted by cam surface 90 and is increasingly depressed as firing pin 26 moves downwardly.\

In the fully fired position, armature 84 is fully depressed, and thus firing pin position switch 70 is fully closed (in the exemplary case of a normally open switch). Cam surface 90 is provided by a portion of firing pin 26 which has a variable cross sectional area taken normal to longitudinal axis 42. This results in armature 84 essentially encountering a "ramped" surface as firing pin moves downwardly, resulting in a very smooth depression of armature 84 in contrast to the abrupt impact of prior designs.

Firing pin position switch 70 is thus arranged to detect when firing pin 26 is in the unfired and fired positions. In the unfired position, firing pin position switch 70 will be open as cam surface 90 does not contact it, and thus electrical monitoring of switch 70 will show an open switch. In the fired position, firing position switch 70 will be closed by cam surface 90, and thus electrical monitoring of a switch state of switch 70 will show a closed switch. As a result, cam surface 90 is arranged such that it contacts the firing pin position switch upon a movement of firing pin 26 within the first bore 52, namely movement of the firing pin from the unfired position to the fired position.

As another advantage of the above described spatial relationship between the firing pin 26 and firing pin position switch 70 is the ability to set switch stroke length for a push-button style switch. That is, the firing pin position switch 70 may be inserted into bore 58 at a predefined depth with will allow for a sufficient clearance of armature 84 and a given desired switch stroke from fully opened to fully closed. This allows for a longer open to close transition. For switches with a shorter stroke, firing pin position switch 70 would be positioned deeper within bore 58, with such configurations providing an abrupt open to close transition.

Figure 6:
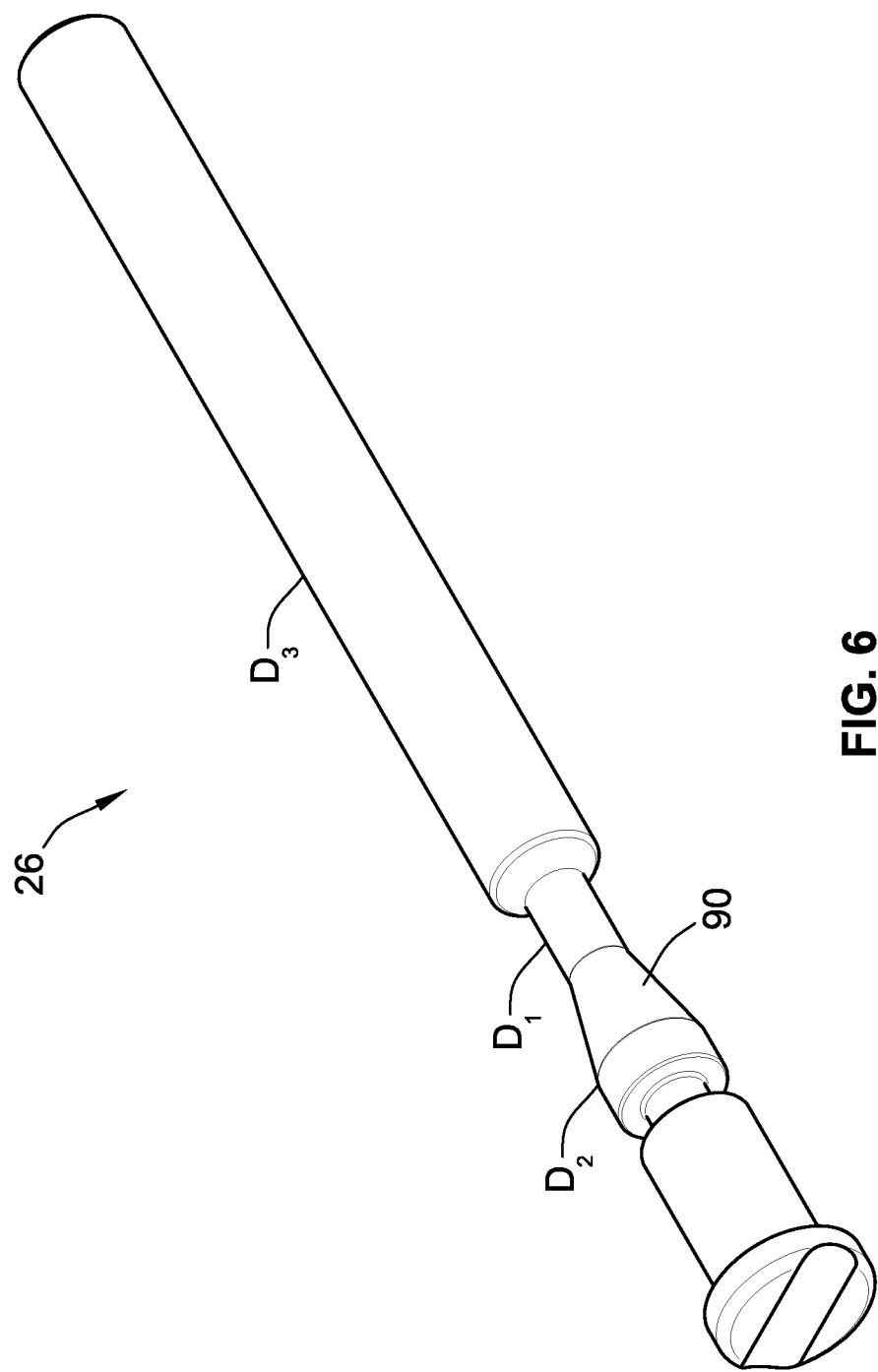
FIG. 6 is perspective view of the firing pin of the solenoid actuator of FIG. 1.

Turning now to FIG. 6, the particular shape of cam surface 90 is shown in greater detail. Cam surface 90 is a truncated conical surface which begins with a diameter $D_1$ which gradually increases to a diameter $D_2$ which is the same as a diameter $D_3$ of an elongated portion of firing pin 26 sized to be received in first bore 52. The particular geometry of cam surface 90 may be varied depending upon desired application and effect.

For example, it may be desired to maintain firing pin position switch 70 in a closed position in the unfired position, and then gradually open the switch when moving to the fired position. To achieve this, the conical extension of cam surface 90 need only be reversed such that cam surface increases in diameter when moving from left to right in FIG. 6, as opposed to the currently shown right to left increase.

It is also contemplated that firing pin position switch 70 may use other detection means for detecting firing pin position. For example, firing pin position switch 70 may for example be embodied as a Hall Effect sensor or a light sensor. In the case of a Hall effect sensor, firing pin 26 may include a magnet in the region of cam surface 90, and in place of cam surface 90. This magnet may for example be situated in a groove, hole, or any other receiving feature, and the sensor would detect the position thereof to determine firing pin 26 position. In the case of a light sensor, firing pin 26 may include a colorized band or patch in the region of cam surface 90, and in place of cam surface 90. This light sensor would detect the colorized band or patch in order to determine firing pin 26 position. Accordingly, the illustration of firing pin position switch 70 is general schematic in nature and is intended to illustrate a push-button style switch, a Hall effect sensor, or a light sensor.

Figure 7:
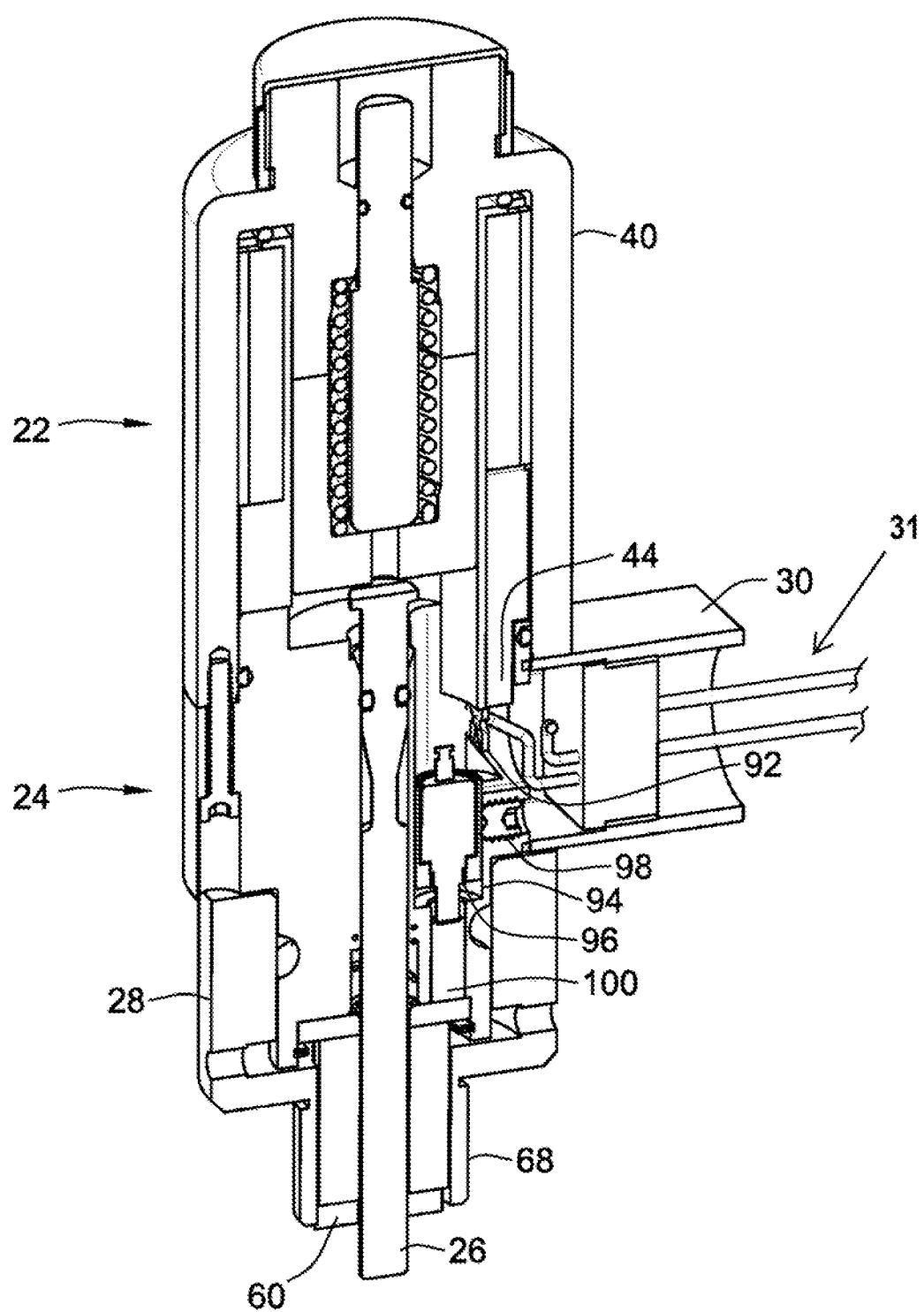
FIG. 7 is another cross section of the solenoid actuator of FIG. 1, showing a connection detection switch of the solenoid actuator.

With reference now to FIG. 7, another cross section of actuator 20 is shown, this time through connection detection arrangement of actuator 20. This connection detection arrangement includes a depressible grommet 60 positioned within an end of firing pin housing 24 and extending through shroud 28 as shown. This depressible grommet is normally biased downwardly by a spring contained within bore 52. Grommet 60 has a flange as shown preventing it from falling out of shroud 28. When actuator 20 is installed on a device, grommet 60 is depressed upwardly in FIG. 7. A pin 100 of the connection detection arrangement is associated with grommet 60 and moves upwardly with grommet 60. Pin 100 in turn contacts a connection detection switch 96 contained within a bore 94.

Similar to firing pin position switch 70, connection detection switch 96 is also a push button style switch, which is actuated by pin 100 when grommet is moved upwardly during installation. As a result, connection detection switch 96 is closed, and this provides a signal indicative of full installation of actuator 20. As was the case with firing pin position switch 70, connection detection switch 96 is electrically connected to electrical wiring via termination port 30. This switch 96 may receive electrical power at this location and/or be connected to a controller external to actuator 20.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A solenoid actuator, comprising:
a solenoid assembly, the solenoid assembly comprising a movable armature the movable armature movable along a longitudinal axis of the solenoid actuator;
a firing pin housing, said firing pin housing having a first bore aligned along the longitudinal axis and a second bore communicating with the first bore, the second bore defining a bore axis transverse to the longitudinal axis;
a firing pin movable within the first bore of the firing pin housing, said firing pin arranged such that said movable armature contacts the firing pin to transition the firing pin from an unfired position to a fired position; and
a firing pin position switch positioned within the second bore of the firing pin housing and arranged to detect when the firing pin is in the unfired and fired position.

2. The solenoid actuator of claim 1, wherein the coil assembly further comprises a solenoid coil far moving the movable armature, the solenoid coil and armature contained by a solenoid housing of the solenoid assembly.

3. The solenoid actuator of claim 2, wherein the solenoid assembly is attached to the firing pin housing.

4. The solenoid actuator of claim 3, wherein the firing pin housing includes a termination port for connecting lead wires to the solenoid actuator.

5. The solenoid actuator of claim 4, Wherein an electrical connection is formed between the solenoid coil and the lead wires within the firing pin housing.

6. The solenoid actuator of claim 1, wherein the firing pin includes a cam surface along a length of the firing pin, the cam surface arranged such that it contacts the firing pin position switch upon a movement of the firing pin within the first bore.

7. The solenoid actuator of claim 6, wherein the firing pin position switch is a push-button switch which includes a protruding armature, wherein depression of said protruding armature either opens or closes the firing pin position switch, and wherein the protruding armature is a cam follower which follows the cam surface of the firing pin.

8. The solenoid actuator of claim 1, wherein the firing pin position switch is one of a push button style switch, a Hall Effect sensor, or a light sensor.

9. The solenoid actuator of claim 1, further comprising a shroud connected to the firing, pin housing, the providing, a mounting feature.

10. The solenoid actuator of claim 1, further comprising a connection detection switch, said connection detection switch operable to detect when said solenoid actuator is installed on a device.

11. A solenoid actuator, comprising:
a solenoid assembly, the solenoid assembly comprising a movable armature;
a firing pin housing, said firing pin housing having a first bore and a second bore;
a firing pin movable within the first bore of the firing pin housing, said firing pin arranged such that said movable armature contacts the firing pin to transition the firing pin from an unfired position to a fired position, said firing pin having a cam surface along a length of said firing pin; and
a firing pin position switch, the firing pin position switch mounted within the second bore and arranged such the firing pin position switch is actuated by the cam surface of the firing pin.

12. The solenoid actuator of claim 11, wherein the coil assembly further comprises a solenoid coil for moving the movable armature, the solenoid coil and armature contained by a solenoid housing of the solenoid assembly.

13. The solenoid actuator of claim 12, wherein the solenoid assembly is attached to the firing pin housing.

14. The solenoid actuator of claim 13, wherein the firing pin housing includes a termination port for connecting lead wires to the solenoid actuator.

15. The solenoid actuator of claim 14, wherein an electrical connection is formed between the solenoid coil and the lead wires within the firing pin housing.

16. The solenoid actuator of claim 11, wherein the cam surface of the firing pin has a cross sectional area perpendicular to the length of the firing pin which continuously varies along the length of said firing pin.

17. The solenoid actuator of claim 16, wherein the firing pin position switch is a push-button switch which includes a protruding armature, wherein depression of said protruding armature either opens or doses the firing pin position switch, and wherein the protruding armature is a cam follower which follows the cam surface of the firing pin.

18. The solenoid actuator of claim 11, wherein the firing pin position switch includes a visual indicator in the form of an LED light which provides an indication of a switch state of the firing pin position switch.

19. The solenoid actuator of claim 11, further comprising a shroud connected to the firing pin housing, the shroud providing a mourning feature.

20. The solenoid actuator of claim 11, further comprising a connection detection switch, said connection detection switch operable to detect when said solenoid actuator is installed on a device.

21. The solenoid actuator of claim 11, wherein the first bore is arranged along a longitudinal axis of the solenoid actuator, and wherein the second bore defines a bore axis, wherein the bore axis is transverse to the longitudinal axis.

22. A method of forming a solenoid actuator, comprising:
providing a solenoid assembly comprising a movable armature, the movable armature movable along a longitudinal axis of the solenoid actuator;
connecting, the solenoid assembly to a firing pin housing, said firing pin housing having a first bore aligned along the longitudinal axis and a second bore communicating with the first bore, the second bore defining a bore axis transverse to the longitudinal axis;
situating a firing pin within the first bore of the firing pin housing, said firing pin arranged such that said movable armature contacts the firing pin to transition the firing pin from an unfired position to a fired position; and
situating a firing pin position switch within the second bore of the firing pin housing such that the firing pin position switch detects when the firing pin is in the unfired and fired position.

23. The method of forming the solenoid actuator of claim 22, wherein the step of situating the firing pin within the housing includes situating a firing pin with a cam surface within the housing such that the cam surface contacts an armature of the firing pin position switch upon a movement of the firing pin.

24. The method of forming the solenoid actuator of claim 23, wherein the step of situating the firing pin switch within the second bore includes situating the firing pin within the second bore such that a visual indicator of the firing pin switch is exposed on an exterior of the firing pin housing.

25. The method of forming the solenoid actuator of claim 22, wherein the step of situating the firing pin position switch within the second bore includes situating the firing pin position switch with the second bore at a predefined depth based on a stroke length of an armature of said firing pin position switch.

\* \* \* \* \*

UNITED STATES PATENT AND TRADEMARK OFFICE
CERTIFICATE OF CORRECTION

PATENT NO. : 10,935,151 B2  
APPLICATION NO. : 16/058014  
DATED : March 2, 2021  
INVENTOR(S) : Patrick Thomas Schwobe et al.

Page 1 of 1

It is certified that error appears in the above-identified patent and that said Letters Patent is hereby corrected as shown below:

In the Claims

Claim 2, Column 9, Line 18, reads as "assembly further comprises a solenoid coil far moving the" and should read --assembly further comprises a solenoid coil for moving the--

Claim 5, Column 9, Line 27, reads as "5. The solenoid actuator of claim 4, Wherein an electrical" and should read --5. The solenoid actuator of claim 4, wherein an electrical--

Claim 9, Column 9, Line 45, reads as "shroud connected to the firing, pin housing, the providing, a" and should read --shroud connected to the firing pin housing providing a--

Claim 17, Column 10, Line 19, reads as "ing armature either opens or doses the firing pin position" and should read --ing armature either opens or closes the firing pin position--

Claim 19, Column 10, Line 28, reads as "providing a mourning feature" and should read --providing a mounting feature--

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*